US009396197B2

(12) United States Patent
Hwang et al.

(10) Patent No.: US 9,396,197 B2
(45) Date of Patent: Jul. 19, 2016

(54) INSERTING MEDIA CONTENT FROM MULTIPLE REPOSITORIES

(75) Inventors: Jennifer Hwang, Bellevue, WA (US); Omeed Musavi, Seattle, WA (US); Amado Villescas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 417 days.

(21) Appl. No.: 13/299,338

(22) Filed: Nov. 17, 2011

(65) Prior Publication Data

US 2013/0133037 A1   May 23, 2013

(51) Int. Cl.
 G06F 21/00 (2013.01)
 G06F 17/30 (2006.01)
 G06F 21/62 (2013.01)

(52) U.S. Cl.
 CPC ...... *G06F 17/30058* (2013.01); *G06F 21/6218* (2013.01)

(58) Field of Classification Search
 CPC .............. G06F 17/30058; G06F 17/30893; G06F 21/6218; H04N 21/23109
 USPC .......................................................... 726/4, 1
 See application file for complete search history.

(56) References Cited

U.S. PATENT DOCUMENTS

| 6,781,609 | B1 | 8/2004 | Barker et al. | |
|---|---|---|---|---|
| 7,440,975 | B2 * | 10/2008 | Williams et al. | |
| 7,590,750 | B2 | 9/2009 | Adbo et al. | |
| 7,676,449 | B2 | 3/2010 | Baio et al. | |
| 7,735,096 | B2 | 6/2010 | Weiss et al. | |
| 8,533,796 | B1 * | 9/2013 | Shenoy et al. | 726/6 |
| 8,626,823 | B2 * | 1/2014 | Kumar | 707/721 |
| 2004/0054919 | A1 * | 3/2004 | Duri et al. | 713/200 |
| 2006/0271699 | A1 * | 11/2006 | Lee | H04L 29/06027 709/230 |
| 2008/0126947 | A1 * | 5/2008 | Cartmell et al. | G06F 9/4443 715/747 |
| 2008/0256563 | A1 * | 10/2008 | Han | 719/329 |
| 2009/0046677 | A1 * | 2/2009 | Toledano et al. | 370/338 |
| 2009/0123090 | A1 * | 5/2009 | Li | G06Q 30/02 382/305 |
| 2009/0125511 | A1 * | 5/2009 | Kumar | G06Q 10/107 |
| 2011/0030046 | A1 * | 2/2011 | Shemenski et al. | 726/9 |

(Continued)

FOREIGN PATENT DOCUMENTS

CN            101969407 B       2/2011

OTHER PUBLICATIONS

Thurott, Paul, "Office Web Apps vs. Google Cloud Connect: Which is the Better Solution for Microsoft Office Users?", Retrieved at <<http://www.windowsitpro.com/article/office/office-web-apps-vs-google-cloud-connect-which-is-the-better-solution-for-microsoft-office-users->>, Mar. 1, 2011, pp. 3.

(Continued)

*Primary Examiner* — Hadi Armouche
*Assistant Examiner* — Ali Shayanfar
(74) *Attorney, Agent, or Firm* — Tom Wong; Julie Kane Akhter; Micky Minhas

(57) ABSTRACT

Methods and systems for inserting media content from multiple media content repositories are disclosed herein. The method includes displaying indicia corresponding to a number of repositories within a user interface that is authorized to access all of the repositories, wherein the repositories may include a local repository and an online repository, or any combination thereof. The method also includes obtaining media content from any of the repositories via the user interface and inserting the media content into a location via the user interface.

18 Claims, 7 Drawing Sheets

(56) References Cited

U.S. PATENT DOCUMENTS

| | | | | |
|---|---|---|---|---|
| 2011/0138484 | A1* | 6/2011 | de Jong | 726/29 |
| 2011/0161174 | A1* | 6/2011 | Simms et al. | 705/14.58 |
| 2011/0196826 | A1* | 8/2011 | Retief | H04L 67/325 707/621 |
| 2011/0289424 | A1* | 11/2011 | Rovik et al. | 715/744 |
| 2011/0320429 | A1* | 12/2011 | Doig | G06F 17/30893 707/711 |
| 2011/0321003 | A1* | 12/2011 | Doig | G06F 8/34 717/107 |
| 2012/0054143 | A1* | 3/2012 | Doig | G06Q 30/0243 706/47 |
| 2012/0059875 | A1* | 3/2012 | Clark | H04L 67/14 709/203 |

OTHER PUBLICATIONS

Carraro, et al., "Software as a Service (SaaS): An Enterprise Perspective", Retrieved at <<http://msdn.microsoft.com/en-us/library/aa905332.aspx>>, Oct. 2006, pp. 7.

Warren, Tom, "Microsoft planning Facebook chat integration for Office 15", Retrieved at <<http://www.winrumors.com/microsoft-planning-facebook-chat-integration-for-office-15/>>, Mar. 17, 2011, pp. 3.

Kim, Yang-Hoon et al. 'The Design of Component Repository Management System for Semantic Web', Journal of Korea Multimedia Society vol. 11, No. 2, Feb. 2008, pp. 237-246, See abstract, Figs. 6-8, pp. 242-246 (English abstract).

Lee, Seung-Hyun et al. 'Semantic Repository Management Mechanism using DHT in Multi-Agent Environments', International Technical Conference on Circuits Systems, Computer and Communications, 2009, pp. 559-560 (English Translation).

Ma, Young Chul et al. 'An Automatic Testing Method for Android GUI Using XML', Dongguk University, Department of Computer Engineering and Science, Proceedings of Korea Computer, vol. 38, No. 1(B), 2011.

Won, Jae-Kang et al. 'Design of a Repository Management System for Shared Repository in Workflow', Proceedings of the 28th KISS Fall Conference, 2001, pp. 313-315. See abstract, Figs. 1-2, pp. 314-315.

"International Search Report", Mail Date: Jan. 2, 2013, Application No. PCT/US2012/064588, Filed date: Nov. 12, 2012, pp. 9.

"First Office Action and Search Report Issued in Chinese Patent Application No. 201210464813.7", Mailed Date: Feb. 28, 2015, 11 Pages.

Office Action and Search Report Issued in Chinese Patent Application No. 201210464813.7, Mailed Date: Nov. 24, 2015, 5 Pages.

Third Office Action and Search Report Issued in Chinese Patent Application No. 201210464813.7, Mailed Date: Mar. 3, 2016, 15 Pages.

\* cited by examiner

200

INSERTING MEDIA CONTENT FROM MULTIPLE REPOSITORIES

BACKGROUND

New methods and systems for storing personal media content, such as personal images and videos, are being developed. For example, many different third party services provide users with access to local or online services or repositories for storing personal information. Therefore, users can store personal media content on a variety of different local or online repositories simultaneously. However, such repositories often utilize different systems for user identification. In many circumstances, this may make it difficult for users to easily access and utilize their personal media content, since the media content may be spread out across multiple repositories with multiple different corresponding usernames and passwords. Moreover, a vast number of online repositories provide users with access to a multitude of media content. However, locating specific media content that is spread out across multiple online repositories make become burdensome for the user in the absence of a centralized method for accessing such repositories.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

An embodiment provides a method for inserting media content from multiple media content repositories. The method includes displaying indicia corresponding to a number of repositories within a user interface that is authorized to access all of the repositories, wherein the repositories may include a local repository and an online repository, or any combination thereof. The method also includes obtaining media content from any of the repositories via the user interface and inserting the media content into a location via the user interface.

Another embodiment provides a system for inserting media content from multiple media content repositories. The system includes a repository management service configured to provide a user interface to a user device. The user device is configured to display indicia corresponding to a number of repositories within a user interface that is authorized to access all of the repositories. The repositories may include a local repository and an online repository. The user device is also configured to obtain media content from any of the repositories via the user interface and insert the media content into a location via the user interface.

Another embodiment provides one more non-volatile, computer-readable storage media for storing computer-readable instructions. The computer-readable instructions provide a media content insertion system when executed by one or more processing devices. The computer-readable instructions include code configured to display indicia corresponding to a number of repositories within a user interface that is authorized by a user to access all of the repositories. The repositories include a local repository and an online repository. The computer-readable instructions also include code configured to obtain media content from any of the repositories via the user interface and insert the media content into a document, a presentation, or a Website, or any combinations thereof, via the user interface.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Numbers in the 100 series refer to features originally found in FIG. 1, numbers in the 200 series refer to features originally found in FIG. 2, numbers in the 300 series refer to features originally found in FIG. 3, and so on.

DETAILED DESCRIPTION

Embodiments disclosed herein set forth a method and system for inserting media content into a document, presentation, or Website, or any combinations thereof, from any of a number of repositories. The media content may include, for example, photos, videos, or audio content. The repositories may include local repositories that may be located within a user device or online repositories that may be accessed by the user device through a network, or any combinations thereof. Moreover, the repositories may be powered by third party services. As an example, the current method and system may be used to insert a user's personal image from a social media repository into a local document on the user's computer.

The method and system disclosed herein may be implemented through the use of a user interface, wherein the user interface may be provided to the user device by a repository management service. A user of the user device may authorize the repository management service to access any of a number of personal repositories. Then, the user may obtain and insert personal media content into a location without logging in to any of the individual repositories. Instead, the user may log in to the repository management service through a particular program or application located within the user device, and the repository management service may utilize tokens to access the desired repositories. This may reduce the burden on the user by allowing the user to select and insert desired media content from various local or online repositories through one user interface, instead of obtaining the desired media content by logging in to every repository separately.

Figure 1:
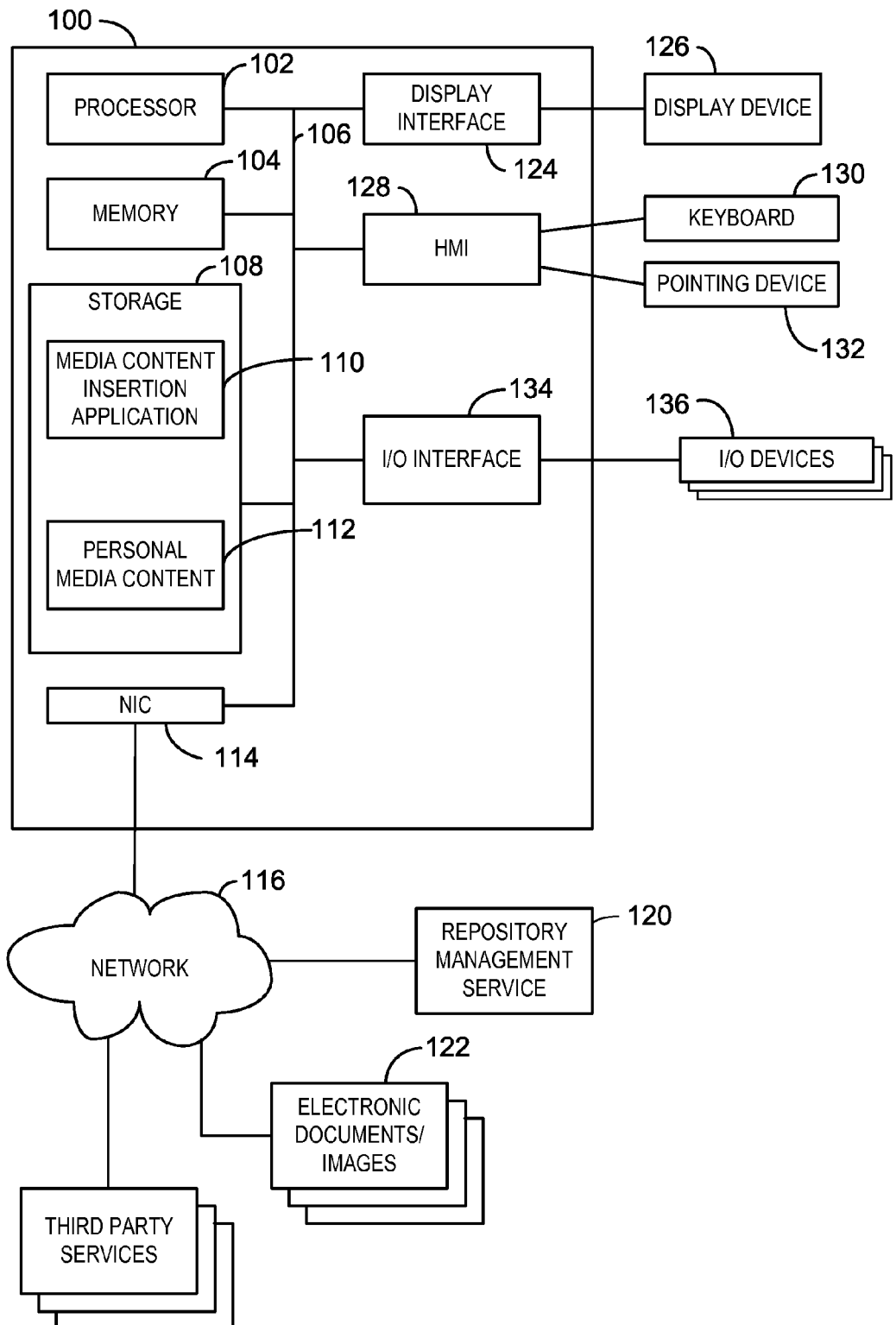
FIG. 1 is a block diagram of a computing system within which media content insertion from multiple local or online repositories may be performed.

As a preliminary matter, some of the figures describe concepts in the context of one or more structural components, variously referred to as functionality, modules, features, elements, etc. The various components shown in the figures can be implemented in any manner, for example, by software, hardware (e.g., discreet logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discreet logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of a computing system 100 within which media content insertion from multiple local or online repositories may be performed. The computing system 100 may be implemented within a user device, wherein the user device may be, for example, an independent personal computing device or one of multiple computing devices included within a client platform. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (RAM), read only memory (ROM), flash memory, or any other suitable memory systems. These instructions implement a method that includes obtaining media content from multiple repositories in a user-friendly manner and inserting such media content into a local file within the computing system 100.

The computing system 100 may also include a storage device 108 adapted to store a media content insertion application 110 for obtaining personal media content from a local or online repository and inserting the personal media content into a local document or file. The storage device may also be adapted to store personal media content 112 obtained from the local or online repositories for future usage. The storage device 108 can include a hard drive, an optical drive, a thumbdrive, an array of drives, or any combinations thereof.

A network interface controller 114 may be adapted to connect the computing system 100 through the bus 106 to a network 116. Through the network 116, electronic text and imaging input documents 118 may be downloaded and stored within the computer's storage system 108. In addition, the network 116 may also be adapted to connect the computing system 100 to a repository management service 120 or third party services 122, or any combinations thereof. The repository management service 120 and the third party services 122 may be located within any number of remote servers or computing devices.

The computing system 100 may be linked through the bus 106 to a display interface 124 adapted to connect the computing system 100 to a display device 126, wherein the display device 126 may include a computer monitor, camera, television, projector, or mobile device, among others. A human machine interface 128 within the computing system 100 may connect the computing system 100 to a keyboard 130 and a pointing device 132, wherein the pointing device 132 may include a mouse, trackball, touchpad, joy stick, pointing stick, stylus, or touchscreen, among others. An input/output (I/O) interface 134 may also be adapted to connect the system 100 through a bus 106 to one or more I/O devices 136, such as a camera, a printer, or the like.

Figure 2:
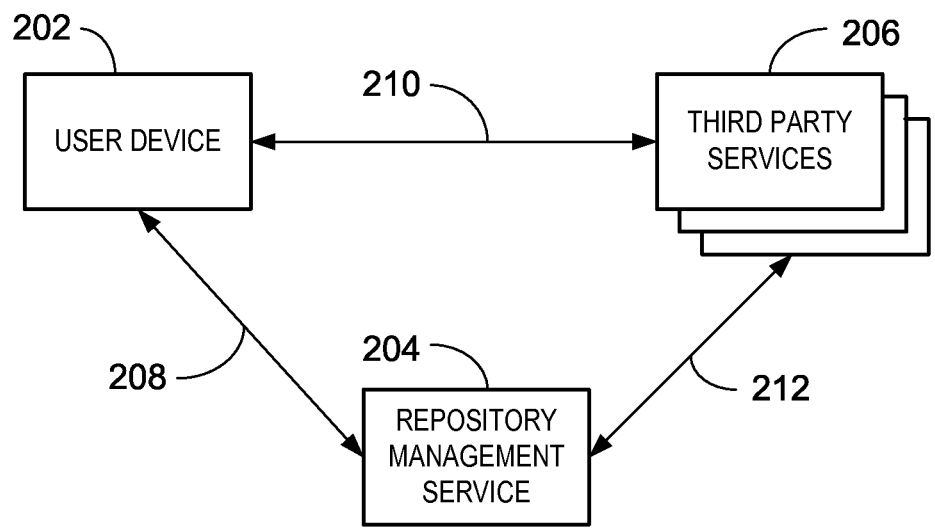
FIG. 2 is an embodiment of a system for media content insertion from multiple local or online repositories.

FIG. 2 is an embodiment of a system 200 for media content insertion from multiple local or online repositories. The system 200 may include a user device 202, a repository management service 204, and third party services 206, among others. In some embodiments, the user device 202 may be included within a client platform (not shown). The client platform may include any number of centralized servers connected to multiple user devices, as well as any number of databases for storing digital media content or other information. The user device 202 may include any type of computing device which is capable of storing or displaying digital media content, such as a mobile device, laptop computer, desktop computer, gaming device, or television, among others. Moreover, the repository management service 204 and the third party services 206 may include any number of servers or other computing devices, wherein the servers may include, for example, cloud servers or Web servers.

The user device 202, the repository management service 204, and the third party services 206 may be coupled to each other through a network (not shown). The network may include any type of network or combination of networks that provide access to the servers or other computing devices included within the system 200. In some embodiments, for example, the network may include a local area network (LAN), a wide area network (WAN), a wireless wide area network (WWAN), or the Internet, among others. In addition, the user device 202, the repository management service 204, and the third party services 206 may be colocated and physically coupled to each other.

The user device 202 may be communicably coupled to the repository management service 204 through a wired or wireless connection, as indicated by the arrow 208. The user device 202 may also be communicably coupled to the third party services 206 through a wired or wireless connection, as indicated by the arrow 210. The third party services 206 may be configured to support any of a number of local or online repositories. The user of the user device 202 may access such repositories through the third party services 206 by creating a user account for each of the third party services 206 that host a desired repository. The user may then use the repositories to store personal media content, such as audio files, video files, or image files, or any combinations thereof.

The user of the user device 202 may gain access to the repository management service 204 through the creation of a user account for the repository management service 204, or through the entering of log-in information if the user is already registered with the repository management service 204. Moreover, the user of the user device 202 may authorize the repository management service 204 to access the media content stored within any number of the repositories hosted by particular third party services 206. The authorization may be performed for a particular repository by a user entering personal log-in information or other account information for the third party service 206 hosting the desired repository into a user interface provided to the user device 202 by the repository management service 204.

Once the user has entered such personal log-in information for any number of the third party services 206, the repository management service 204 may retrieve tokens from the third party services 206, as indicated by the arrow 212. The tokens may be used to provide authorized access to particular repositories hosted by the third party services 206. When the user device 202 communicates with the repository management service 204, the repository management service 204 may send the tokens to the user device 202, as indicated by the arrow 208. The user device 202 may then use the tokens to directly access the third party services 206 via the user interface, as indicated by the arrow 210. In various embodiments, the user device 202 may download specific media content from particular local or online repositories via the user interface and insert such media content into a location or file within the user device 202.

Figure 3:
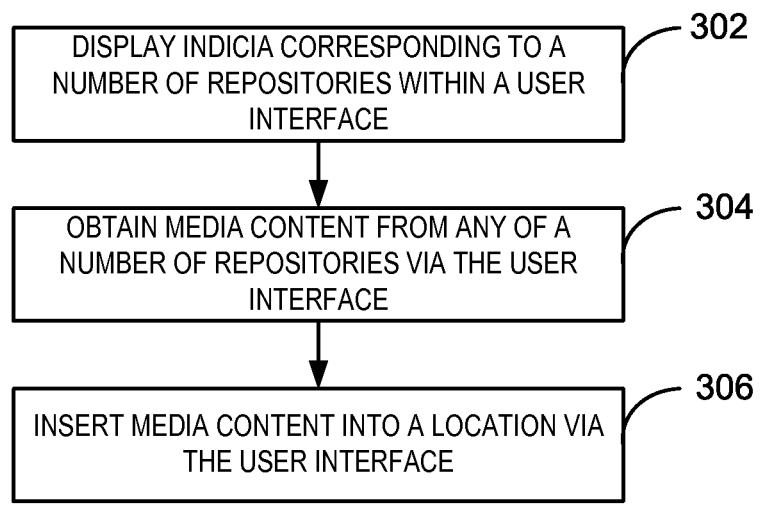
FIG. 3 is a block diagram of a method for media content insertion within a computing environment.

FIG. 3 is a block diagram of a method 300 for media content insertion within a computing environment. The method begins at block 302 with the displaying of indicia corresponding to a number of repositories within a user interface. The indicia may include, for example, links to each of the repositories or displayed media content from each of the repositories. In various embodiments, the repositories may include specific repositories that have been authorized to interact with the user interface on behalf of a user of a user device. The repositories may include a local repository on the user device, as well as an online repository accessed by the user device via a network. Moreover, the repositories may also include multiple local repositories or multiple online repositories, or any combinations thereof. The user interface may be a Web user interface that is provided to the user through the user device by a repository management service. The user of the user device may gain access to the repository management service by logging-in to the repository management service using specific account information, such as a username and password. In various embodiments, the repository management service may provide the user interface to the user device through a network in response to a user's click on a media content insertion icon displayed on the user device.

In various embodiments, the user of the user device may authorize the repository management service to interact with the repositories by inputting user identification information for each of the repositories via the user interface. The user identification information may include, for example, a username and password for a particular third party service that hosts a selected repository. Moreover, once the user enters the user identification information for a specific repository into the user interface, the repository management service may gain access to a token relating to the user identification information for the repository.

The token may specify the access rights of the repository management service with regard to the selected repository. For example, the token may provide the repository management service with permission to access a user's personal media content that is stored on the particular repository. Moreover, the repository management service may use a separate token for authorizing an interaction with each of the repositories. Furthermore, the tokens for the repositories may be generated using any of a variety of different authorization techniques, including, for example, an open standard for authorization known as "Open Authorization" (OAuth). In an embodiment, OAuth may allow for the easy sharing of private resources stored on one Website with another Website through the use of private, encrypted tokens to authorize the interaction between the two Websites.

In some embodiments, if a selected repository is a local repository, the repository management service may access the repository without authorization by the user. Such local repositories may include memory or storage locations within the user device, wherein the memory or storage locations are configured to store the user's personal media content. Such media content may include any form of audio, video, or imaging content generated or uploaded by the user, as well as any form of audio, video, or imaging content that is accessible by the user device through any type of external device that is communicably coupled to the user device. Such external devices may include, for example, digital cameras, mobile phones, tablets, Universal Serial Bus (USB) devices, or external hard drives, among others.

At block 304, media content may be obtained from any of the number of repositories at the user interface. The repositories may be chosen by the user from the number of possible repositories displayed within the user interface. In various embodiments, the user of the user device may obtain the media content from a selected repository via the user interface by clicking on a search icon for the selected repository. The search icon may be a link to a specific authorized location or group of locations within the selected repository, wherein the specific authorized location or group of locations may include personal media content of the user. Moreover, each authorized repository may have an associated search icon. Therefore, specific media content may be independently chosen and obtained from each selected repository according to the preferences of the user. Moreover, the user interface may also include icons for any number of unauthorized repositories, wherein the icons may include links to the third party services that host the particular unauthorized repositories. In an embodiment, if a user clicks on an icon for an unauthorized repository, the user may be prompted to authorize the repository management service to access the particular unauthorized repository by entering user identification information for the corresponding third party service. Thus, the user may continuously add additional repositories to the list of selected repositories from which the repository management service may obtain media content through the user interface.

At block 306, the obtained media content may be inserted into a location via the user interface. The location may include, for example, a document, presentation, or file stored on the user device, as well a Website accessed by the user device through the network. The obtained media content may be inserted into the location in response to a user's click on a media content insertion icon within the user interface. Moreover, in an embodiment, the user interface may divide the obtained media content into categories based on specific types of media content, and the user interface may include separate pages or tabs for the insertion of each type of media content. According to this embodiment, the media content insertion icon may be represented by a video content insertion icon, an audio content insertion icon, or an imaging content insertion icon, or any combinations thereof, based on the specific type of media content that is supported by the currently-opened page or tab of the user interface.

The blocks 302, 304, and 306 of the method 300 are intended as exemplary embodiments of the steps of the media content insertion method disclosed herein. However, the block diagram of the method 300 is not intended to indicate that the steps of the method 300 are to be executed in any particular order or that all of the steps are to be included in every case. Furthermore, any number of steps may be added to the method 300 according to the specific application.

Figure 4:
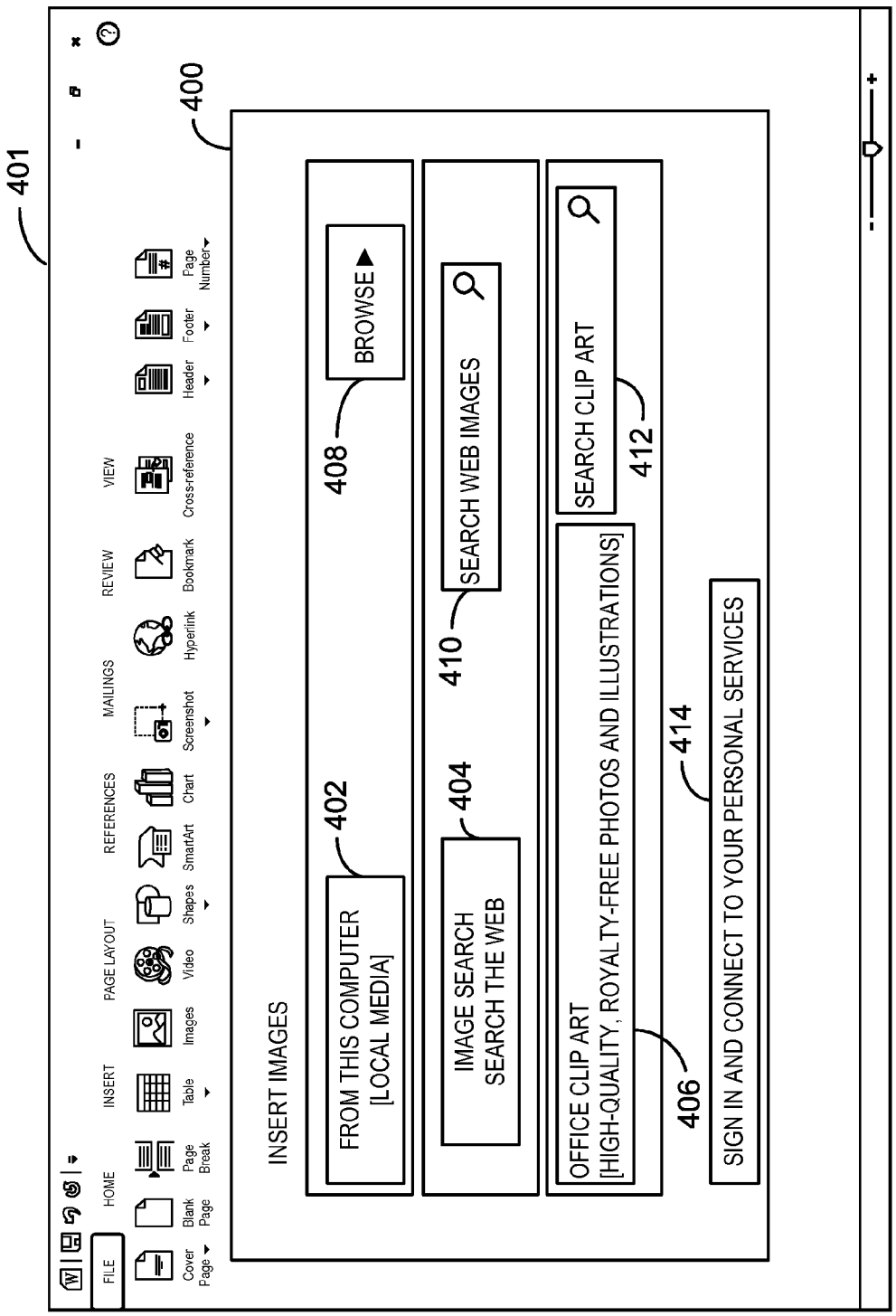
FIG. 4 is an illustration of an embodiment of a user interface for media content insertion that may be displayed by a user device.

FIG. 4 is an illustration of an embodiment of a user interface 400 for media content insertion that may be displayed by a user device. The user interface 400 may be a Web user interface hosted by a repository management service. The user interface 400 may be provided to the user device by the repository management service and displayed on a screen of the user device in response to a user's click on a media content insertion icon. The media content insertion icon may be located within any of a number of specific programs or applications located within the user device.

In an embodiment, the user interface 400 may be displayed within the Microsoft® Office program and may be directed to the insertion of image content into a Microsoft® Office document 401. Moreover, the user interface 400 may present the user of the user device with options of multiple repositories from which images may be selected, including, for example, a local image repository 402 on the user device, a Web-based image repository 404, or a Microsoft® Office "Clip Art" image repository 406. The user of the user device may then click on a "Browse" icon 408 if the user desires to search for images in the local image repository 402, a "Search Web Images" icon 410 if the user desires to search for images in the Web-based image repository 404, or a "Search Clip Art" icon 412 if the user desired to search for images in the Microsoft® Office Clip Art image repository 406. In an embodiment, the "Search Web Images" icon 410 and the "Search Clip Art" icon 412 may include search boxes, and the user may input search criteria into the search boxes in order to directly search for specific images within the corresponding repositories. Furthermore, if the user desires to authorize the repository management service to access other online repositories through the user interface, the user may click on a repository management service sign-in icon 414. In an embodiment, the repository management service sign-in icon 414 may display a message for the user, such as "Sign In and Connect to Your Personal Services." Once the user clicks on the repository management service sign-in icon 414, the user may sign in to the repository management service using a username and password, or any other suitable form of personal identification. The user interface 400 may then be updated to provide the user with additional options for the insertion of media content into the Microsoft® Office document, as discussed further with respect to FIG. 5.

Figure 5:
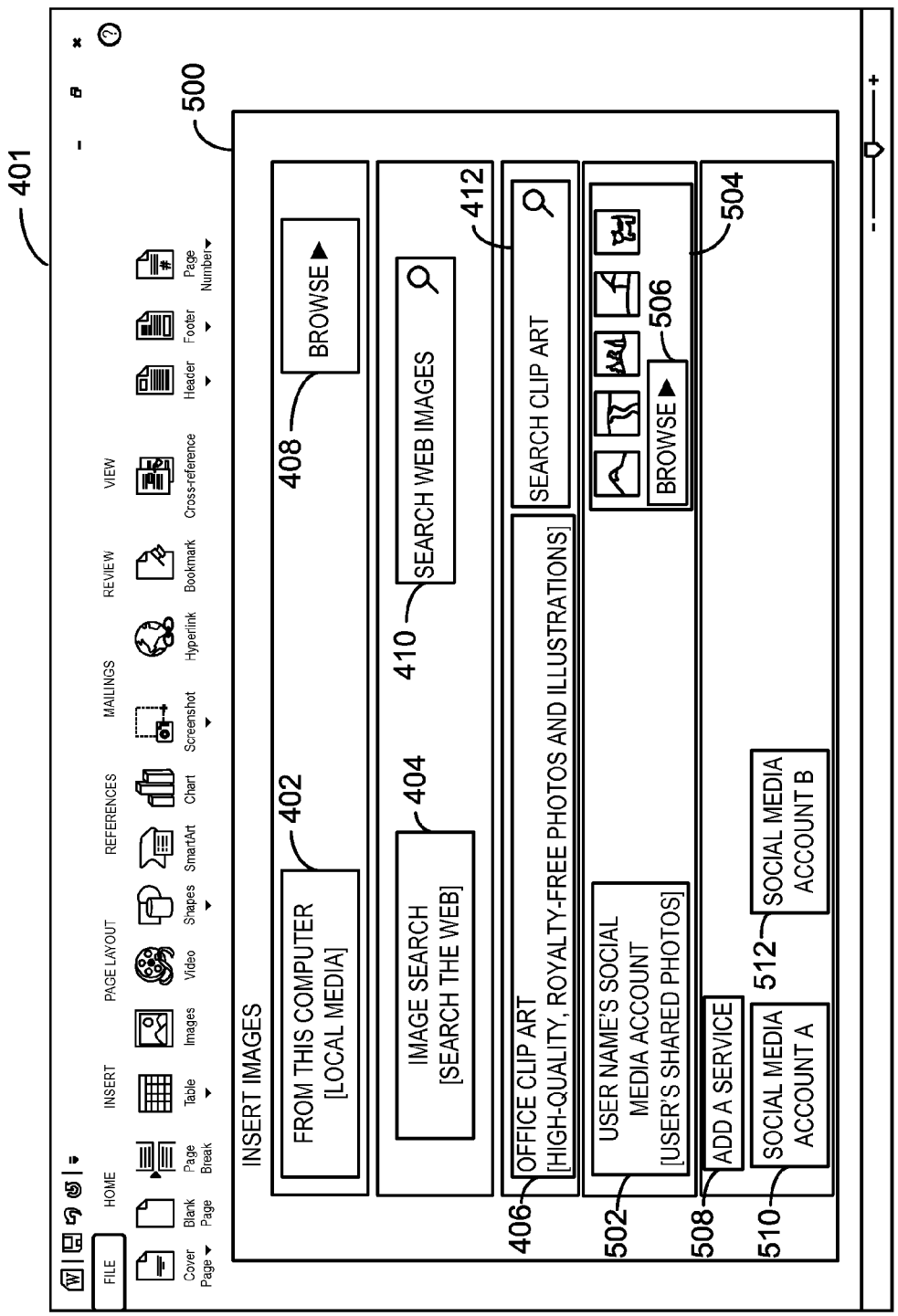
FIG. 5 is an illustration of an embodiment of a user interface for media content insertion that may be displayed by a user device in response to a log-in to a repository management service by a user.

FIG. 5 is an illustration of an embodiment of a user interface 500 for media content insertion that may be displayed by a user device in response to a log-in to a repository management service by a user. Like numbered items are as described with respect to FIG. 4. The user interface 500 may be generated from the user interface 400 in response to a user's sign-in to the repository management service. The user interface 500 may display any online repositories that have already been authorized by the user. For example, a "User Name's Social Media Account" repository 502 may represent an authorized online repository that is powered by a specific third party service. The user interface 500 may display images 504 from the "User Name's Social Media Account" repository 502. Moreover, if the user desires to view more images from the "User Name's Social Media Account" repository 502, the user may click on a "See More" icon 506 that is associated within the images 504 from the repository 502. Once the user clicks on the "See More" icon 506, the user interface 500 may be updated to provide the user with a larger number of displayed images from the "User Name's Social Media Account" repository 502, as discussed further with respect to FIG. 6.

In various embodiments, the user interface 500 includes an "Add a Service" feature 508 in order to provide the user with the opportunity to authorize the repository management service to access additional online repositories through the user interface 500. For example, the user may click on the icon 510 or 512 to sign-in to the "Social Media Account A" or the "Social Media Account B", respectively. Furthermore, once the user signs in to one of the social media accounts, the user may be prompted to give the repository management service permission to access specific media content within the social media account, and a token may be used to provide the repository management service with a method for verifying the access permission granted by the user.

Figure 6:
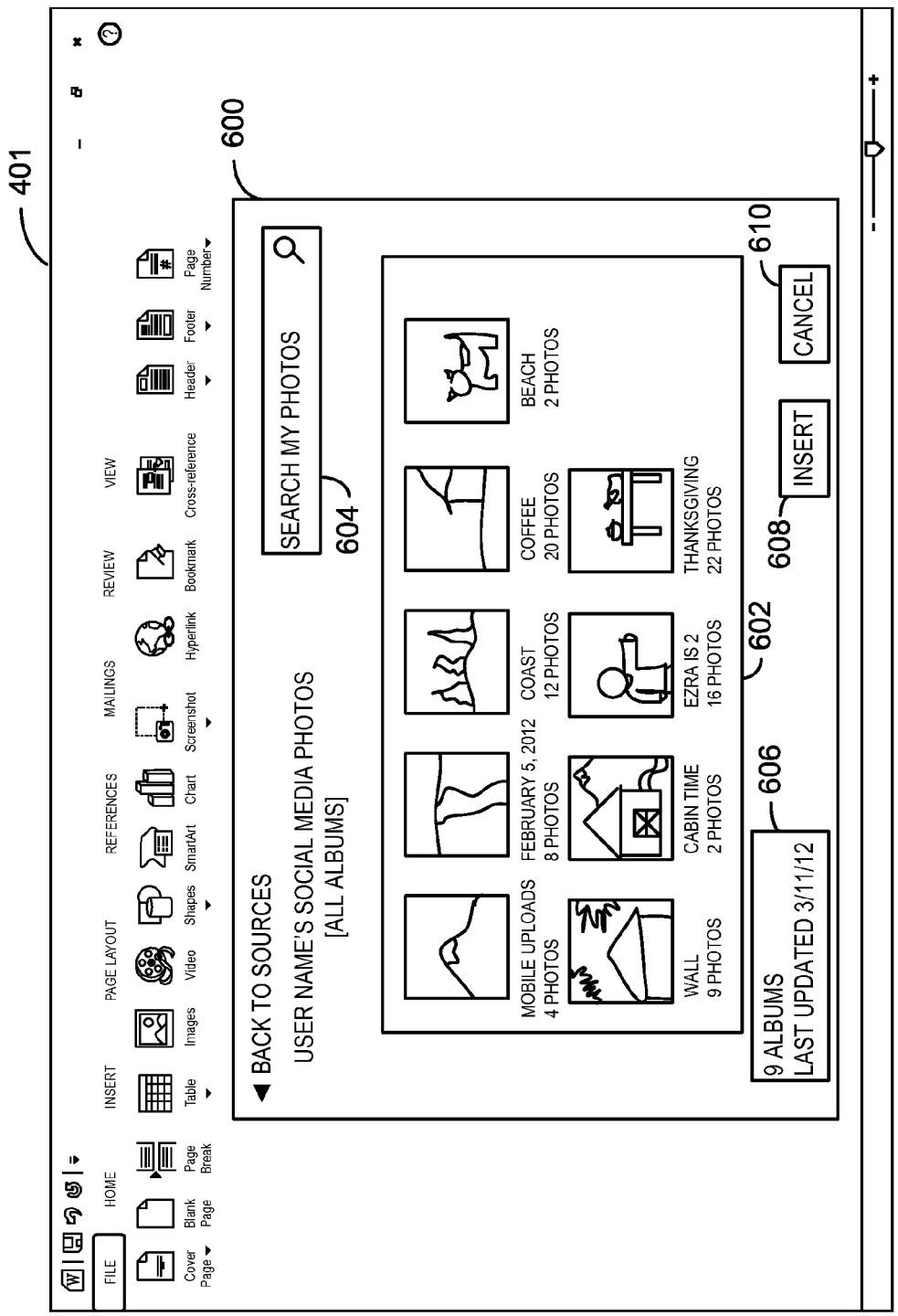
FIG. 6 is an illustration of an embodiment of user interface for media content insertion that may be displayed by a user device in response to a selection by a user of a repository from which to obtain media content.

FIG. 6 is an illustration of an embodiment of user interface 600 for media content insertion that may be displayed by a user device in response to a selection by a user of a repository from which to obtain media content. Like numbered items are as described with respect to FIGS. 4 and 5. The user interface

600 may be generated from the user interface 500 in response to a user's click on the "See More" icon 506 that is associated with the images 504 from the "User Name's Social Media Account" repository 502 described with respect to FIG. 5. The user interface 600 may display any number of the photo albums 602 stored within the "User Name's Social Media Account" repository 502. In addition, the user interface 604 may include a search box 604, which may allow the user to specify search criteria for the displaying of the photo albums 602 or the individual photos within the photo albums 602. In an embodiment, the search box 604 may display a message for the user, such as "Search My Photos."

In various embodiments, the user interface 600 displays information 606 pertaining to the media content within the currently-opened repository. The information 606 may include, for example, the number of albums in the repository or the date that the repository was last updated. Furthermore, the user interface 600 may include an "Insert" icon 608 for inserting a selected image into the Microsoft® Office document, as well as a "Cancel" icon 610 for cancelling the image insertion procedure and exiting the user interface 600.

Figure 7:
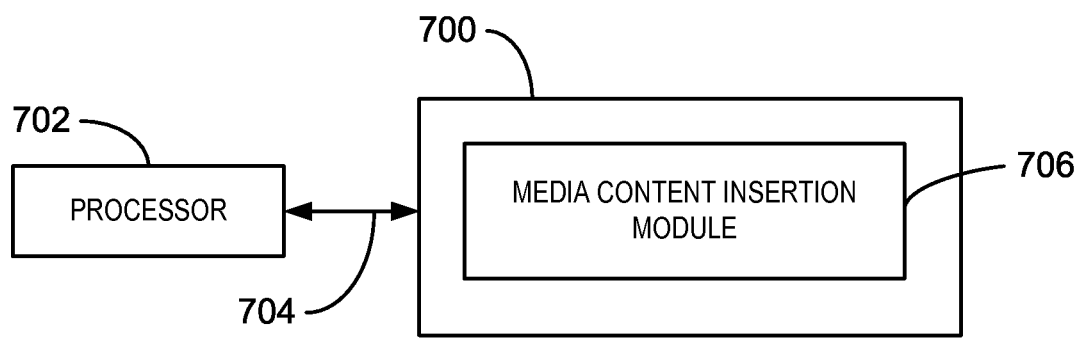
FIG. 7 is a block diagram showing a tangible, computer-readable medium that stores code adapted to allow for the insertion of media content from multiple repositories into a location through a user interface.

FIG. 7 is a block diagram showing a tangible, computer-readable medium 700 that stores code adapted to allow for the insertion of media content from multiple repositories into a location through a user interface. The tangible, computer-readable medium 700 may be accessed by a processor 702 over a computer bus 704. Furthermore, the tangible, computer-readable medium 700 may include code configured to direct the processor 702 to perform the steps of the current method.

The various software components discussed herein may be stored on the tangible, computer-readable medium 700, as indicated in FIG. 7. For example, a media content insertion module 706 may be configured to allow for the insertion of media content form multiple local or online repositories into a document, presentation, or Website. The media content may include photos, videos, or audio content, or any combination thereof. Moreover, the media content insertion module 706 may be hosted within a program or application on a user device, wherein the user device may be any type of computing device capable of supporting such media content. Furthermore, the tangible, computer-readable medium 700 may include any number of additional software components not shown in FIG. 7.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for obtaining media content from multiple media content repositories, comprising:
   authorizing a user interface to interact with a plurality of repositories based on user identification information received as input for each of the plurality of repositories, wherein the user interface is received from a repository management service through a network in response to a log-in to the repository management service by a user;
   storing the user identification information for each of the plurality of repositories;
   displaying indicia corresponding to the plurality of repositories within the user interface that is authorized to access the plurality of repositories, the plurality of repositories comprising a local repository of media content and an online repository of media content from an authorized third party service;
   obtaining, via a processor, media content from the plurality of repositories via the user interface;
   dividing the obtained media content into categories based on types of the media content, the types of the media content comprising audio content, video content, and imaging content; and
   inserting, via the user interface, the divided media content from the plurality of repositories into a file based on categories of media content supported by the user interface, wherein the plurality of repositories are authorized based on the user identification information.

2. The method of claim 1, wherein obtaining the media content from any of the plurality of repositories comprises selecting any of a plurality of available repositories from which to obtain the media content via the user interface.

3. The method of claim 1, wherein inputting the user identification information comprises accessing tokens for the plurality of repositories.

4. The method of claim 3, comprising using the tokens to authorize an interaction between the user interface and the plurality of repositories.

5. The method of claim 4, wherein the tokens are generated using an Open Authorization standard.

6. The method of claim 1, wherein obtaining the media content from any of the plurality of repositories comprises downloading personal media content from any of a plurality of local or online personal repositories via the user interface.

7. The method of claim 1, wherein obtaining the media content from any of the plurality of repositories comprises selecting any of a plurality of personal images, videos, or audio files of a user.

8. The method of claim 1, wherein inserting the media content into the location comprises inserting the media content into a document, a file, a presentation, or a Website, or any combinations thereof.

9. The method of claim 1, comprising initiating the user interface within a program located on a user device in response to a user's click on a media content insertion icon hosted within the program.

10. A system for obtaining media content from multiple media content repositories, comprising:
    a memory device to store processor executable instructions; and
    a hardware processor that, based on an execution of the processor executable instructions, is to:
    authorize a user interface to interact with a plurality of repositories based on user identification information received as input for each of the plurality of repositories, wherein the user interface is to be received from a repository management service through a network in response to a log-in to the repository management service by a user;
    store the user identification information for each of the plurality of repositories;
    display indicia corresponding to the plurality of repositories within the user interface that is authorized to access the plurality of repositories, the plurality of repositories comprising a local repository of media content and an online repository of media content from an authorized third party service;
    obtain media content from the plurality of repositories via the user interface;

divide the obtained media content into categories based on types of the media content, the types of the media content comprising audio content, video content, and imaging content; and insert, via the user interface, the divided media content from the plurality of repositories into a file based on categories of media content supported by the user interface, wherein the plurality of repositories are authorized based on the user identification information.

11. The system of claim 10, wherein the user interface comprises a Web user interface downloaded from the repository management service and hosted on the user device.

12. The system of claim 10, wherein the plurality of repositories are provided by a plurality of third party services.

13. The system of claim 10, wherein the location comprise a local or online location within a computing environment.

14. The system of claim 10, wherein the media content comprises video content, imaging content, or audio content, or any combinations thereof.

15. The system of claim 10, wherein the user interface is provided to the user device by the repository management service through a network in response to a click on a media content insertion icon by a user.

16. The system of claim 15, wherein the user interface comprises search icons for any number of the plurality of repositories, and wherein a particular search icon comprises a link to the media content within a particular repository.

17. The system of claim 10, wherein the indicia comprise links to each of the plurality of repositories or displayed media content obtained from each of the plurality of repositories.

18. One or more computer-readable storage devices for storing computer-readable instructions, the computer-readable instructions providing a media content system that, based on execution by one or more processing devices, cause the one or more processing devices to:

authorize a user interface to interact with a plurality of repositories based on user identification information received as input for each of the plurality of repositories, wherein the user interface is received from a repository management service through a network in response to a log-in to the repository management service by a user;

store the user identification information for each of the plurality of repositories;

display indicia corresponding to the plurality of repositories within the user interface that is authorized by the user to access the plurality of repositories, the plurality of repositories comprising a local repository of media content and an online repository of media content from an authorized third party service;

obtain media content from the plurality of repositories via the user interface;

divide the obtained media content into categories based on types of the media content, the types of the media content comprising audio content, video content, and imaging content; and insert, via the user interface, the divided media content from the plurality of repositories into a file based on categories of media content supported by the user interface, wherein the plurality of repositories are authorized based on the user identification information.

* * * * *